(12) United States Patent
Abram et al.

(10) Patent No.: US 7,748,404 B2
(45) Date of Patent: Jul. 6, 2010

(54) MULTI-PURPOSE EXHAUST VALVE SPRING

(75) Inventors: Kwin Abram, Columbus, IN (US); Govindaraj Kalyanasamy, Indianapolis, IN (US)

(73) Assignee: Emcon Technologies LLC, Wilmington, DE (US)

( * ) Notice: Subject to any disclaimer, the term of this patent is extended or adjusted under 35 U.S.C. 154(b) by 240 days.

(21) Appl. No.: 11/692,964

(22) Filed: Mar. 29, 2007

(65) Prior Publication Data

US 2008/0237521 A1   Oct. 2, 2008

(51) Int. Cl.
  *F16K 15/00*   (2006.01)
(52) U.S. Cl. ..................................... 137/527
(58) Field of Classification Search ................ 137/527, 137/527.6
  See application file for complete search history.

(56) References Cited

U.S. PATENT DOCUMENTS 4,625,943 A * 12/1986 Groger ....................... 251/305
5,305,787 A * 4/1994 Thygesen .................... 137/527
2006/0048388 A1   3/2006 Lorenz et al.

FOREIGN PATENT DOCUMENTS

| DE | 3804975 | 8/1989 |
| DE | 4439432 | 2/1995 |
| DE | 4439432 C1 * | 11/1995 |
| DE | 10252424 | 5/2004 |
| GB | 1239520 | 7/1971 |
| JP | 9013997 | 1/1997 |

OTHER PUBLICATIONS

International Search Report and Written Opinion dated May 16, 2008.
International Preliminary Report on Patentability from corresponding PCT/US2008/051834.

* cited by examiner

*Primary Examiner*—John Rivell
*Assistant Examiner*—Macade Brown
(74) *Attorney, Agent, or Firm*—Carlson, Gaskey & Olds

(57) ABSTRACT

An exhaust valve includes a valve body that is fixed for rotation with a shaft supported by at least one bushing. A single spring is used to bias the shaft to hold the valve body in a valve closed position, and to exert an axial load on the shaft to seal the shaft against the bushing to prevent exhaust gas leakage.

18 Claims, 1 Drawing Sheet

MULTI-PURPOSE EXHAUST VALVE SPRING

TECHNICAL FIELD

The subject invention relates to a spring for an exhaust valve that is configured to exert both torsional and axial loads during installation to hold the exhaust valve in a desired operational position as well as preventing exhaust gas leakage.

BACKGROUND OF THE INVENTION

Exhaust valves are used in exhaust components to control exhaust flow rate. Exhaust valves typically include a valve body that is located within an exhaust flow path defined by an exhaust component. The valve body is moveable between a closed position where at least a substantial portion of the exhaust flow path is blocked by the valve body and an open position where blocking of the exhaust flow path is minimized.

The valve body is fixed to a shaft that is supported by bushings. An exhaust valve spring is used to apply a torsional load to the shaft to bias the valve body toward the closed position. One disadvantage with this traditional configuration is that exhaust gas can leak along a path formed between the shaft and the bushing.

Thus, there is a need for a spring and shaft configuration for an exhaust valve that can bias a valve body in a desired operational position in addition to eliminating any exhaust gas leakage.

SUMMARY OF THE INVENTION

An exhaust valve includes a valve body that is rotatable with a shaft between open and closed positions. The shaft is rotatably supported by at least one bushing. A single spring is configured to exert both a torsional load and an axial load on the shaft. The torsional load serves to bias the shaft to hold the valve body in a valve closed position. The axial load serves to seal the shaft against the bushing to prevent exhaust gas leakage.

In the example shown, the spring is defined by a wire diameter that is less than a first pitch dimension when the spring is in a free length or uninstalled condition. When installed, the spring is torsionally and axially compressed resulting in a second pitch dimension that is less than the first pitch dimension. This provides a torsional force to bias the shaft and associated valve body toward the closed position.

In the example shown, the shaft is defined by a first diameter and includes a collar portion defined by a second diameter that is greater than the first diameter. When installed, the spring is compressed in an axial direction, which causes the collar portion to seal against an end face of the bushing. This prevents exhaust gas from leaking out between the shaft and the bushing.

Thus, the subject invention utilizes a single spring to both bias the valve body in a desired operational position and to prevent exhaust gas leakage by sealing the shaft against the supporting bushing.

These and other features of the present invention can be best understood from the following specification and drawings, the following of which is a brief description.

DETAILED DESCRIPTION OF THE PREFERRED EMBODIMENT

Figure 1:
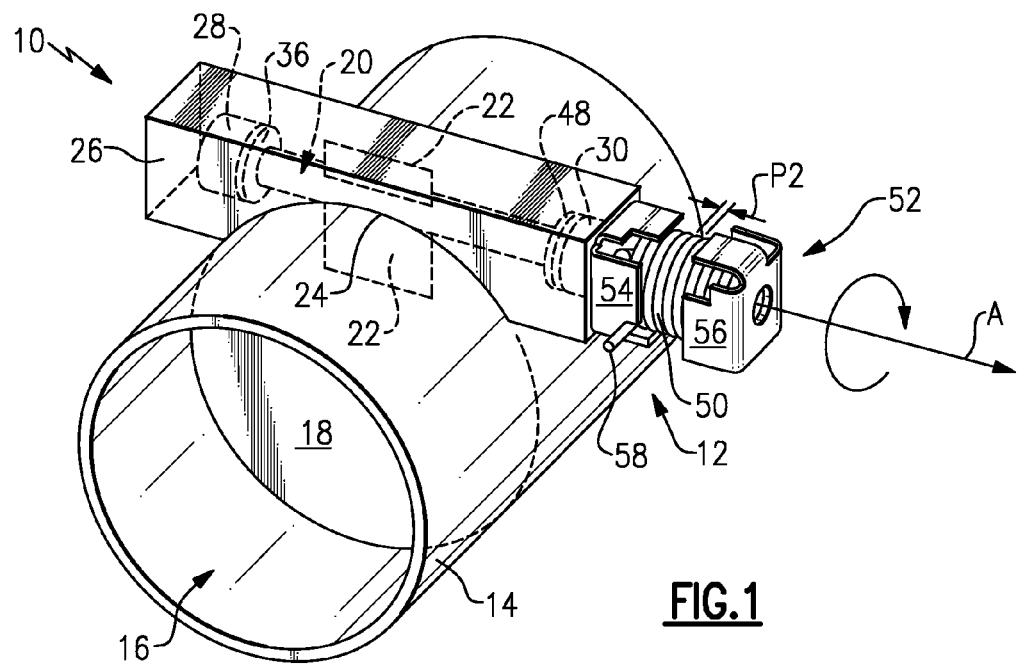
FIG. 1 shows a perspective view of an exhaust component and exhaust valve assembly incorporating the subject invention.

An exhaust component 10 (FIG. 1) includes an exhaust valve assembly 12 that is movable between an open position and a closed position. In the example shown, the exhaust component 10 comprises a tube body 14 that defines an exhaust gas flow path 16. The exhaust valve assembly 12 includes a valve body 18 that blocks at least a substantial portion of the exhaust gas flow path 16 when in the closed position and is pivoted toward the open position to minimize blockage.

The valve body 18 is fixed to a shaft 20 with a tang 22. A slot 24 is formed within an outer surface of the tube body 14. A housing 26, shown in this example as a square metal structure, is received within this slot 24 and is welded to the tube body 14. Other housing configurations could also be used. The shaft 20 is rotatably supported within the housing 26 by first 28 and second 30 bushings. In the example shown, the tang 22 comprises a piece of sheet metal that has one portion welded to the shaft 20 and another portion that extends outwardly from the housing 26 and is welded to the valve body 18. Thus, the valve body 18 and the shaft 20 pivot together about an axis A. The tang 22 is just example of how the shaft 20 can be attached to the valve body 18, it should be understood that other attachment mechanisms could also be used.

Figure 2:
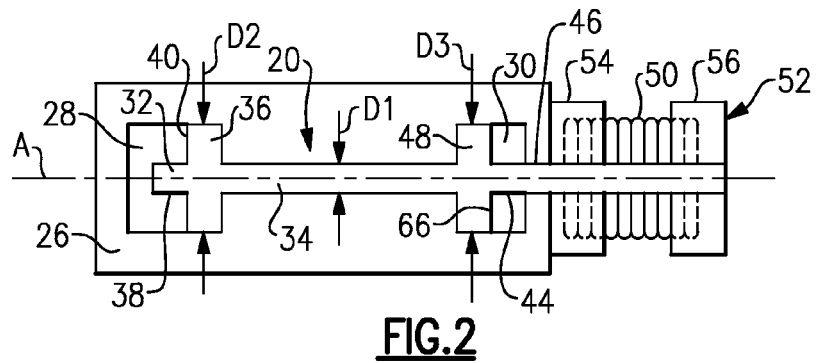
FIG. 2 shows a schematic view of a valve shaft, bushings, and spring as used in the assembly of FIG. 1.

The first bushing 28 is positioned generally at a first shaft end 32. As shown in FIG. 2, the first bushing 28 comprises a sealed interface for the first shaft end 32. The shaft 20 includes a shaft body 34 that is defined by a first diameter D1. Near the first shaft end 32 is a first collar 36 that is defined by a second diameter D2 that is greater than the first diameter D1. The first bushing 28 includes a first bore 38 that receives the first shaft end 32 such that the first shaft end 32 does not extend axially beyond the first bushing 28. The first collar 36 abuts directly against an end face 40 of the first bushing 28 such that exhaust gas cannot leak out of the first bushing 28 along a path between the shaft 20 and first bushing 28.

The second bushing 30 includes a second bore 44 through which the shaft body 34 extends to a second shaft end 46. The shaft 20 includes a second collar 48 that is defined by a third diameter D3 that is greater than the first diameter D1. The second D2 and third D3 diameters can be the same or different from each other. The second collar 48 is located axially inboard of the second bushing 30.

The shaft 20 extends through the second bore 44 to an axially outboard position relative to the second bushing 30. A spring 50 is coupled to the second shaft end 46 with a spring retainer 52. The spring retainer 52 includes a first retainer piece 54 that is fixed to the housing 26 and a second retainer piece 56 that is fixed to the second shaft end 46. One spring end 58 is fixed to the first retainer piece 54 and a second spring end 60 (FIG. 3) is fixed to the shaft 20.

The spring 50 comprises a coil spring that is configured to be compressed both in an axial direction along axis A and in a torsional direction about axis A during installation. Torsional loading creates a preload force that biases the shaft 20 and the valve body 18 toward the closed position. As gas flow increases, this torsional force is overcome to move the valve body 18 toward the open position. The axial force serves to positively seat and seal the second collar 48 against an end face 66 of the second bushing 30. This prevents any exhaust gas from leaking out of the second bushing 30 by sealing off a passage between an outer surface of the shaft 20 and a bore surface of the second bushing 30. Thus, a single spring is used to provide both axial and torsional loading, resulting in a configuration that can both hold the exhaust valve assembly 12 in a desired operational position as well as preventing exhaust gas leakage.

Figure 3:
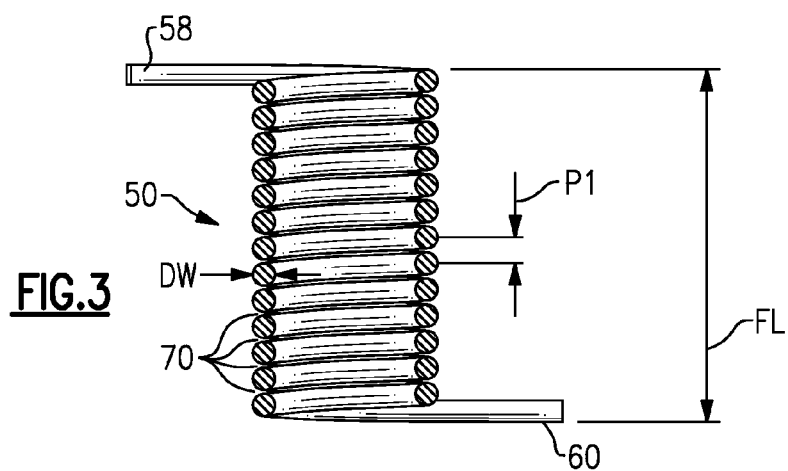
FIG. 3 shows a cross-sectional view of the spring of FIG. 2.

The spring 50 is shown in greater detail in FIG. 3. The spring 50 is a coil spring formed from wire having a diameter Dw. Prior to installation, the spring 50 is defined by a free length condition FL where a first pitch dimension P1 is greater than the diameter Dw. This relationship results in spacing between adjacent coils by a gap 70. The gaps 70 between adjacent coils enable the spring 50 to be compressed in the axial direction as well as in the torsional direction during installation. This results in a second pitch dimension P2 (FIG. 1) that is less than the first pitch dimension P1.

In one example configuration, the spring 50 has a wire diameter Dw that is approximately 1.8 mm, and a first pitch dimension P1 that is greater than 2 mm. The spring 50 also has an overall outer diameter of 17 mm and a free length FL of approximately 30 mm. When compressed for installation this free length FL is reduced by approximately 5 mm. It should be understood that this is just one example configuration and that other configurations could be used as needed to provide desired characteristics.

By utilizing a single spring that can act both in torsion and axially, the shaft can be loaded against the bushing, which will minimize exhaust gas leakage between the shaft and the bushing. Further, this configuration can be used to minimize build up variations because the shaft will always be positively located against the bushing.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust valve assembly comprising:
   an exhaust tube defining an exhaust flow path, said exhaust tube including a slot that receives a housing;
   a valve body positioned within said exhaust flow path;
   a shaft fixed to said valve body, said valve body being pivotable by said shaft between a valve open position and a valve closed position, and said shaft having a shaft body extending between first and second collars, said shaft body being defined by a first diameter and said first and said second collars being defined by respective second and third diameters, and wherein said second and said third diameters are greater than said first diameter, and wherein said housing encloses said shaft body and said first and said second collars;
   at least one bushing that rotatably supports said shaft, and wherein said shaft and said at least one bushing are mounted within said housing such that an outer edge portion of said valve body is fixed to said shaft; and
   a spring coupled to said shaft wherein said spring exerts a torsional load on said shaft to bias said shaft toward a valve closed position and exerts an axial load on said shaft to seal said shaft against said at least one bushing.

2. The exhaust valve assembly according to claim 1 wherein said at least one bushing includes a bore that receives said shaft, and wherein said shaft extends through said bore and beyond said at least one bushing to a shaft end that is coupled to said spring.

3. The exhaust valve assembly according to claim 2 including a spring retainer with a first portion fixed to a non-rotating structure at a first position around said shaft and a second portion fixed to said shaft at a second position that is axially spaced along said shaft from said first position, and wherein said torsion spring includes a first spring end that is fixed to said first portion of said spring retainer and a second spring end that is fixed to said shaft.

4. The exhaust valve assembly according to claim 1 wherein said spring comprises a coil spring having a wire diameter, and wherein said coil spring defines a free condition prior to installation having a first pitch dimension that is greater than said wire diameter and defines an installed condition with a second pitch dimension that is less than said first pitch dimension.

5. The exhaust valve assembly according to claim 1 including a spring retainer extending outwardly of said exhaust tube and including a first portion fixed to said housing and a second portion fixed to said shaft, and wherein said spring has one spring end fixed to said first portion of said spring retainer and another spring end fixed to said shaft.

6. The exhaust valve assembly according to claim 1 wherein said spring comprises a single coil spring positioned at only one end of said shaft.

7. An exhaust valve assembly comprising:
   a valve body movable within an exhaust tube between a valve open position and a valve closed position;
   a shaft having first and second ends and a body portion defined by a first diameter extending between said first and second ends, wherein said valve body is fixed for rotation with said shaft at a position along said body portion;
   a collar formed adjacent one of said first and second ends of said shaft, said collar being defined by a second diameter that is greater than said first diameter, and wherein said collar comprises a first collar formed adjacent said first end of said shaft and wherein said shaft includes a second collar formed adjacent said second end of said shaft such that said body portion extends between said first and said second collars, said first collar being defined by said second diameter and said second collar being defined by a third diameter with said second and third diameters being greater than said first diameter;
   at least first and second bushings that rotatably support said shaft; and
   a single spring coupled to said shaft wherein said single spring exerts a torsional load on said shaft to bias said shaft toward the valve closed position and exerts an axial load on said shaft to seal said collar against said at least one bushing, and wherein said first bushing supports said first end of said shaft at a position axially outboard of said first collar such that said first shaft end does not extend axially outboard of said first bushing, and said second bushing supports said shaft at a position axially outboard of said second collar such that said second end of said shaft extends axially outboard of said second bushing to support said single spring.

8. The exhaust valve assembly according to claim 7 wherein said spring is defined by a wire diameter and is movable from a free length condition to a compressed condition when installed, and wherein said spring has a first pitch dimension when in said free length condition that is greater than said wire diameter and has a second pitch dimension that is less than said first pitch dimension when in said compressed condition.

9. An exhaust valve assembly comprising:
   a valve body movable within an exhaust tube between a valve open position and a valve closed position;

a shaft having first and second ends and a body portion defined by a first diameter extending between said first and second ends, wherein said valve body is fixed for rotation with said shaft at a position along said body portion;

a housing installed within a slot formed across an outer surface of said exhaust tube, said shaft being mounted within said housing such that said housing substantially encloses said shaft, and including a tang that secures said valve body to said shaft;

a collar formed adjacent one of said first and second ends of said shaft, said collar being defined by a second diameter that is greater than said first diameter;

at least one bushing that rotatably supports said shaft; and a single spring coupled to said shaft wherein said single spring exerts a torsional load on said shaft to bias said shaft toward the valve closed position and exerts an axial load on said shaft to seal said collar against said at least one bushing.

10. The exhaust valve assembly according to claim 9 including a spring retainer having a first retainer piece fixed to said housing at a first position along said shaft and a second retainer piece axially spaced apart from said first retainer piece along said shaft and fixed to said shaft at a second position such that said first an said second retainer pieces are concentric with said shaft, and wherein said spring includes a first spring end fixed to said first retainer piece and a second spring end fixed to said shaft.

11. A method of controlling movement of a valve body within an exhaust tube comprising the steps:
providing a valve body fixed for rotation with a shaft that is rotatably supported by at least first and second bushings;
supporting the shaft on the first and second bushings within a housing that substantially encloses the shaft and the first and second bushings;
forming a slot across an outer surface of an exhaust tube;
inserting the housing within the slot;
attaching the valve body to the shaft with an attachment member such that the valve body is pivotable within the exhaust tube; and
using a single spring to exert a torsional load on the shaft to bias the valve body toward a valve closed position and to exert an axial load on the shaft to seal the shaft against the at least one bushing.

12. The method according to claim 11 including forming the shaft to have shaft body that extends between a first collar portion near a first shaft end and a second collar portion near a second shaft end with each of the first and second collar portions having a larger diameter than a diameter of the shaft body, and including positioning the second collar portion inboard of the at least one bushing such that the axial load exerted by the single spring causes the second collar portion of the shaft to sealingly engage against an end face of the at least one bushing.

13. The method according to claim 11 including securing a first spring retainer to the housing at first position along the shaft, securing a second spring retainer to the shaft at a second position along the shaft that is axially spaced from the first position, fixing a first spring end of the single spring to the first spring retainer and securing a second spring end of the single spring to the shaft at the second spring retainer.

14. An exhaust valve assembly comprising:
a valve body;
a shaft fixed to said valve body, said shaft having a shaft body extending between first and second collars, said shaft body being defined by a first diameter and said first and said second collars being defined by respective second and third diameters, and wherein said second and said third diameters are greater than said first diameters, and wherein said shaft has a first shaft end near said first collar and a second shaft end near said second collar;
at least first and second bushings that rotatably support said shaft; and
a spring coupled to said shaft wherein said spring exerts a torsional load on said shaft to bias said shaft toward said valve closed position and exerts an axial load on said shaft to seal said shaft against said at least one bushing, and wherein said first bushing supports said first shaft end at a position axially outboard of said first collar such that said first shaft end does not extend axially outboard of said first bushing, and said second bushing supports said shaft at a position axially outboard of said second collar such that said second shaft end extends axially outboard of said second bushing to support said spring.

15. A method of controlling movement of a valve body within an exhaust tube comprising the steps:
providing a valve body fixed for rotation with a shaft that is rotatably supported by at least first and second bushings;
forming the shaft to have shaft body that extends between a first collar portion near a first shaft end and a second collar portion near a second shaft end with each of the first and second collar portions having a larger diameter than a diameter of the shaft body;
using a single spring to exert a torsional load on the shaft to bias the valve body toward a valve closed position and to exert an axial load on the shaft to seal the shaft against the at least one bushing;
positioning the second collar portion inboard of the second bushing such that the axial load exerted by the single spring causes the second collar portion of the shaft to sealingly engage against an end face of the second bushing; and
supporting the first shaft end with the first bushing at a position axially outboard of the first collar such that the first shaft end does not extend axially outboard of the first bushing, and supporting the shaft with the second bushing at a position axially outboard of the second collar such that the second shaft end extends axially outboard of the second bushing to support the single spring.

16. An exhaust valve assembly comprising:
a valve body;
a shaft fixed to said valve body, said shaft having a first shaft end and a second shaft end;
a first collar formed near said first shaft end and a second collar formed near said second shaft end;
at least first and second bushings that rotatably support said shaft, said first bushing being positioned outboard of said first collar such that said first shaft end does not extend axially outboard beyond said first bushing, and said second collar being positioned inboard of said second bushing such that said second shaft end extends axially outboard of said second bushing;
a housing that substantially encloses said shaft and said first and said second bushings, said housing being mounted within a slot formed within an exhaust tube such that said valve body is pivotable within said exhaust tube; and
a single spring coupled to said second shaft end wherein said single spring exerts a torsional load on said shaft to bias said shaft toward a valve closed position and exerts an axial load on said shaft to seal said shaft against said at least one bushing.

17. An exhaust valve assembly comprising:
a valve body;
a shaft fixed to said valve body, said shaft having a first shaft end and a second shaft end;
a first collar formed near said first shaft end and a second collar formed near said second shaft end, wherein said first and second collars are formed as part of said shaft with said valve body being fixed for rotation with said shaft at a position axially between said first and said second collars;
at least first and second bushings that rotatably support said shaft, said first bushing being positioned outboard of said first collar such that said first shaft end does not extend axially outboard beyond said first bushing, and said second collar being positioned inboard of said second bushing such that said second shaft end extends axially outboard of said second bushing; and
a single spring coupled to said second shaft end wherein said single spring exerts a torsional load on said shaft to bias said shaft toward a valve closed position and exerts an axial load on said shaft to seal said shaft against at least one of said first and second bushings, and with said single spring exerting said axial load on said shaft to seal at least one of said first and said second bushings against one of said first and said second collars.

18. An exhaust valve assembly comprising:
a valve body;
a shaft fixed to said valve body, said shaft having a shaft body extending between first and second collars, said shaft body being defined by a first diameter and said first and said second collars being defined by respective second and third diameters, and wherein said second and said third diameters are greater than said first diameter, and wherein said first and second collars are formed as part of said shaft body with said valve body being fixed for rotation with said shaft at a position axially between said first and said second collars;
at least one bushing that rotatably supports said shaft; and
a spring coupled to said shaft wherein said spring exerts a torsional load on said shaft to bias said shaft toward a valve closed position and exerts an axial load on said shaft to seal said shaft against said at least one bushing, and with said spring exerting said axial load on said shaft to seal said at least one bushing against one of said first and said second collars.

* * * * *